United States Patent
Cross

[11] 4,270,839
[45] Jun. 2, 1981

[54] DIRECTIONAL OPTICAL FIBER SIGNAL TAPPING ASSEMBLY

[75] Inventor: Michael A. Cross, Severna Park, Md.

[73] Assignee: Westinghouse Electric Corp., Pittsburgh, Pa.

[21] Appl. No.: 7,460

[22] Filed: Jan. 29, 1979

[51] Int. Cl.³ .............................................. G02B 5/14
[52] U.S. Cl. ................................. 350/96.15; 250/227
[58] Field of Search ............. 350/96.15, 96.16, 96.29, 350/96.30, 96.33; 250/227

[56] References Cited

U.S. PATENT DOCUMENTS

| | | | |
|---|---|---|---|
| 3,931,518 | 1/1976 | Miller | 250/227 |
| 3,936,631 | 2/1976 | Muska | 250/227 |
| 3,982,123 | 9/1976 | Goell et al. | 250/227 |
| 4,012,149 | 3/1977 | Bouillie et al. | 350/96.15 X |
| 4,076,375 | 2/1978 | Muska et al. | 350/96.15 |
| 4,121,890 | 10/1978 | Braun | 350/96.15 X |
| 4,135,780 | 1/1979 | Dyott | 350/96.15 |
| 4,146,298 | 3/1979 | Szczepanek | 350/96.15 |
| 4,165,150 | 8/1979 | Duck et al. | 350/96.15 |

FOREIGN PATENT DOCUMENTS

| | | | |
|---|---|---|---|
| 2064503 | 7/1972 | Fed. Rep. of Germany | 350/96.15 |
| 2409455 | 9/1975 | Fed. Rep. of Germany | 350/96.15 |
| 7613741 | 6/1977 | Netherlands | 350/96.15 |
| 1438961 | 6/1976 | United Kingdom | 350/96.29 |

OTHER PUBLICATIONS

Jeunhomme et al., "Mode Coupling in a Multimode Optical Fiber with Microbends", *Applied Optics*, vol. 14, No. 10, Oct. 1975, pp. 2400-2405.

*Primary Examiner*—John K. Corbin
*Assistant Examiner*—John D. Lee
*Attorney, Agent, or Firm*—J. B. Hinson

[57] ABSTRACT

A directional optical fiber signal tapping assembly. A light pipe rod encircles and accepts stray light rays leaving the otherwise bare outer surface of a length of optical fiber in a region following a location having a bend that induces a selected degree of outward leakage of optical signal rays in the bend following longitudinal light pipe region. Curvature of one end of the light pipe rod conducts the extracted optical signal sample to an optical detector device.

2 Claims, 7 Drawing Figures

4,270,839

DIRECTIONAL OPTICAL FIBER SIGNAL TAPPING ASSEMBLY

BACKGROUND OF THE INVENTION

The present invention relates to an assembly for extracting a sample of an optical signal propagating through an optical fiber and more particularly to such an assembly that is capable of recognizing the direction of such propagation.

The need appears to exist for an assembly or technique for sampling and detecting optical signals passing along an optical fiber, that is simple to mechanize; requires minimal modification of such fiber; provides adjustable coupling over a useful range; avoids introduction of excessive loss in such fiber; and exhibits directional properties.

SUMMARY OF THE INVENTION

An optical fiber signal tapping assembly is hereby provided for use with such as the buffered low loss all-silica multimode optical fiber waveguides currently in volume production, including both the step index type and the graded index type. No permanent modification of the fiber is required other than localized stripping of the protective buffer coating which is a comparatively simple process. Signal extracting capability is achieved by bending the fiber to cause it to leak in a directional manner, the escaping signal energy being captured in a light pipe rod having a curved end to conduct the signal to a detector. The required leakage is attained by introducing an adjustable bending stress that results in bending of the fiber a selectable degree at a particular location; the degree of leakage being in proportion to the applied bending stress. The stress is maintained at a safe level to avoid the possibility of fracture or introduction of excessive loss in the main signal. Some applications may require only intermittent signal sampling, in these situations stress might be applied only during sampling and otherwise relaxed in behalf of avoiding unnecessary insertion loss and any tendency for long term cold flow of the optical fiber in the stressed region which may tend to shorten the life of such fiber. Where continuous sampling is desired it may be desirable to accept reduced coupling where a lifetime of the fiber might otherwise be affected adversely.

DESCRIPTION OF THE PREFERRED EMBODIMENT

Figure 1:
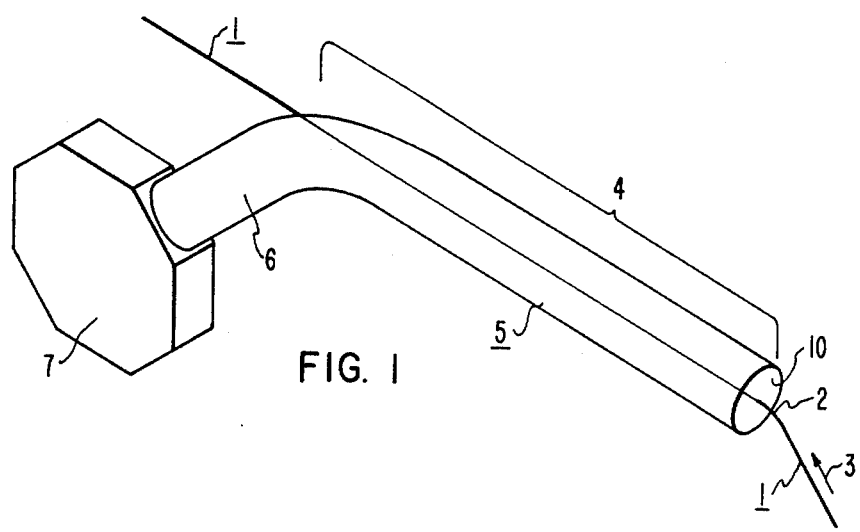
FIG. 1 is an isometric view in outline of a unidirectional optical fiber signal tapping assembly.

Referring to FIG. 1, an optical fiber 1, which may be of a buffered type having a layer of plastic material on its outer surface, is caused to bend somewhat excessively in a local region 2 to cause part of an optical signal traveling along the fiber 1 in the direction of the arrow 3 to leave the confines of such fiber and leak radially outward. From the longitudinal straight region 4 following the leak-inducing region 2, the buffer coating on the fiber is stripped and encased in a rod-shaped light pipe 5 and has a curved portion 6 extending beyond the region 4 at the optical fiber 1 and into optical coupling with an optical signal detector 7 at one end of such region. The light pipe 5 receives the signal leakage from the fiber 1 induced by the bend in region 2 and transmits such leakage signal to the detector 7. The extent of bend chosen for the region 2 is such that the amount of leakage can represent a useful signal sample to be recognized by the detector 7 while avoiding undue reduction in the main signal being propagated through the fiber 1.

Figure 2:
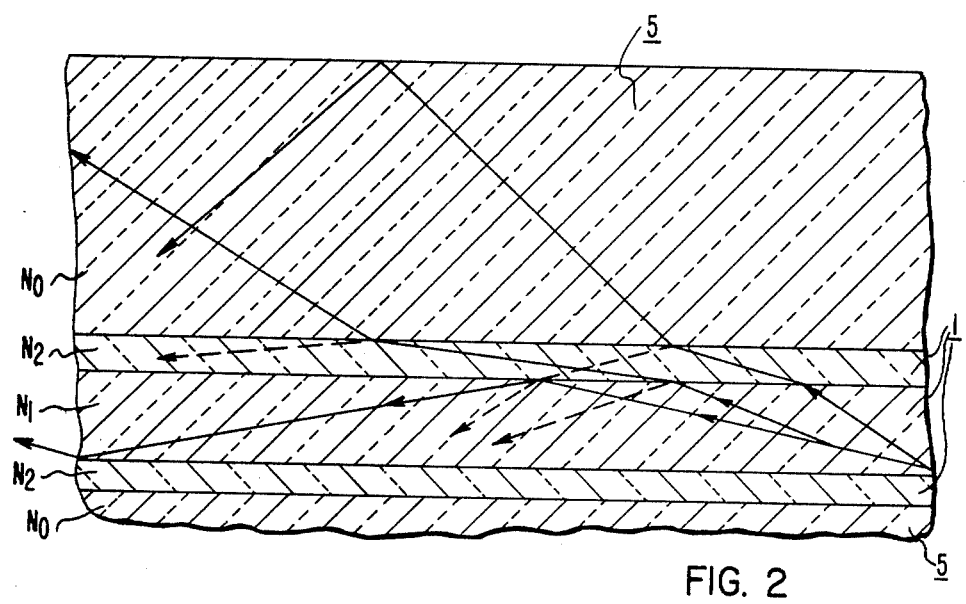
FIG. 2 is a magnified cross-sectional view of a region of the assembly in FIG. 1 showing an optical reflection path within such assemblies.

Referring to FIG. 2, for efficient signal sample extraction to occur, the refractive index number $N_0$ of the light pipe material should have a value equal to or slightly greater than the index $N_2$ of the outer or cladding layer of the light pipe 1. The signal sample extracting action of non-propagating rays from the fiber 1 into the light pipe 5 is depicted in FIG. 2 as the same occurs within the buffer-stripped region 4 of the optical fiber 1 located immediately after the bend region 2. It will be noted that the inherent directionality of these rays is preserved as they couple into the light pipe. Meridional rays are shown for simplicity, but skew rays behave in a similar manner. The dotted lines show partial reflection of the rays at interfaces where there is not an exact refractive index match. Such reflections, however, ultimately leak out of the fiber 1 and are captured by the light pipe 5.

An optical signal in the optical fiber 1 entering the region 4 from the left will couple weakly into the light pipe 5 via upward mode conversion processes, but this energy can be substantially absorbed by an optically black end surface 10 adjacent to the bend region 2 of the optical fiber 1. This upward-mode-conversion leakage will tend to leave the fiber 1 more pronouncedly within the bend region 2, but will be absorbed by the buffer coating on the fiber existing in this region. The directivity of the signal sample assembly will be enhanced to the extent that scattering effects are minimized and energy entering from the left is substantially free of accompanying cladding modes. The latter consideration becomes more important as the signal strength increases, and a mode stripper (not shown) immediately preceding entry of the fiber 1 into the light pipe 5 from the left may be desirable under strong signal conditions.

Figure 4:
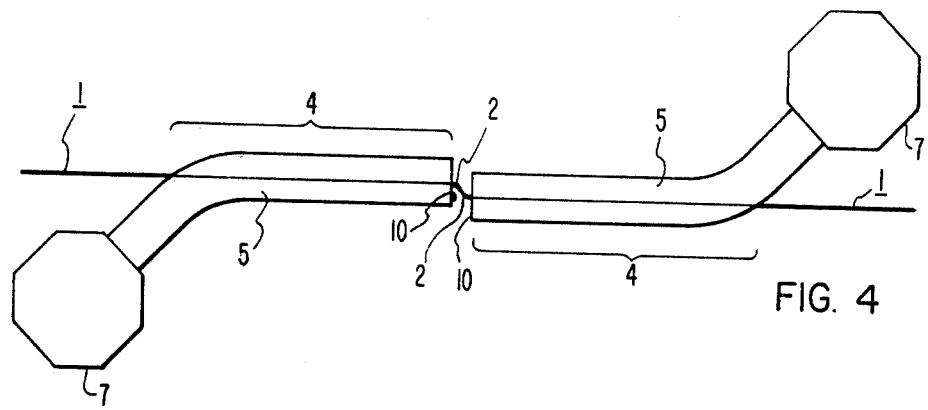
FIG. 4 is a schematic two-dimensional view in outline showing a bi-directional optical fiber signal tapping assembly constructed in accordance with the present invention.

FIG. 4 shows a bidirectional optical fiber signal tapping arranged for an optical fiber that embodies a pair of back-to-back assemblies, each of which may be similar to that shown in FIG. 1, including a pair of optical signal detectors 7 affiliated with a pair of light pipes 5, intermediate optical fiber regions 4 joined by an oppositely-directed double bend region 2,2, the one region 2 causing leakage of optical signal from the fiber 1 during traveling of such signal in one direction and the other such bend causing a corresponding leakage in the opposite direction of signal travel. The S-curved bending of the fiber region intermediate the ends of the two light pipes in the construction of FIG. 2 can be arrived at by radialwise displacement of the axis of one of such light pipes relative to the other, with the optical fiber 1 extending centrally through the two light pipes 5. In either the single-pipe configuration of FIG. 1 or the dual pipe configuration of FIG. 4, when the assembly is manipulated to restore the bend region 2 or bend regions 2 into a non-curved configuration, the aforedescribed leakage-induced signal-sample-extraction phenomenon can be terminated and allow signal propagation through the fiber to return to otherwise normal levels of efficiency.

Figure 3:
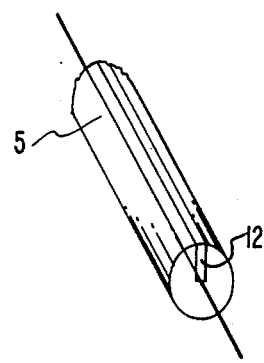
FIG. 3 is an isometric three-dimensional view of a portion of a signal tapping assembly showing details of construction.

FIG. 3 pertains to one method of constructing the signal-sample-extracting portion of the assembly which includes the step of providing a longitudinal slot in the light pipe 5 which extends from the outer periphery to the center of such light pipe and longitudinally from end 10 thereof the entire length of buffer-stripped region 4. After inserting the buffer-stripped portion of the optical fiber 1 into the slot in the light pipe 5, such slot is filled with a material whose refractive index lies between that of the outer cladding portion of the optical fiber 1 and that of the light pipe 5. A typical silica cladding outer layer of optical fiber has a refractive index of about 1.46 and a borosilicate glass (BK7) rod light pipe 5 would have an index of 1.5. The use of a resilient coupling medium 12 having a refractive index of 1.48 would seem to be appropriate. In this regard, Dupont Alvac X150 ehtylene/vinyl acetate resin in solvent solution form could be applied. This material also acts as an adhesive which maintains the optical fiber 1 in position in the slot in the light pipe 5, and its resilience (durometer 65) would provide yieldable support for the bend region 2 of the optical fiber 1. Such coupling medium 12 then acts as a cushion for the bend region to avoid excessive strain of the fiber 1. This can be observed in FIG. 6 as relating to the mid-region between light pipes 5 in the bidirectional signal sampling arrangement shown in FIG. 4, for example. It can be seen that the slots filled with material 12 extend in opposite radial directions in the two adjacent light pipes 5 and that the two light pipes are displaced radially with respect to one another. In effecting radial displacement of one light pipe relative to the other to arrive at the dual bending of the optical fiber 1, it may be that a minor axial displacement between the two light pipes is also desirable in behalf of limiting the extent of tension built up in the optical fiber during such radial displacement.

Figure 5:
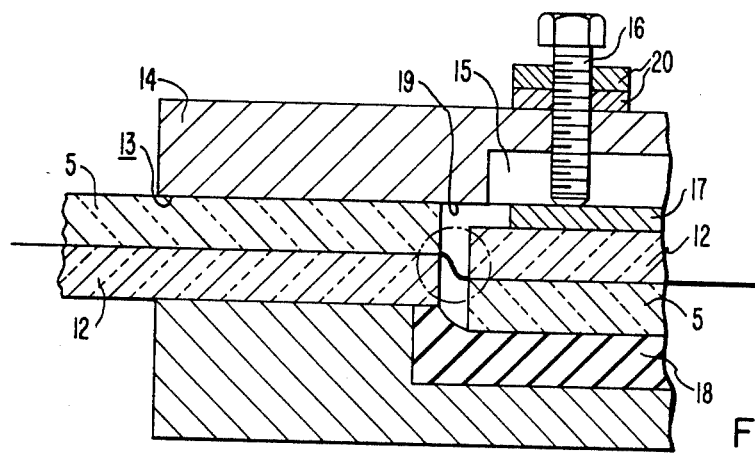
FIG. 5 is a cross-sectional view of the signal-sample-extracting portion of the assembly shown in FIG. 4.
Figure 6:
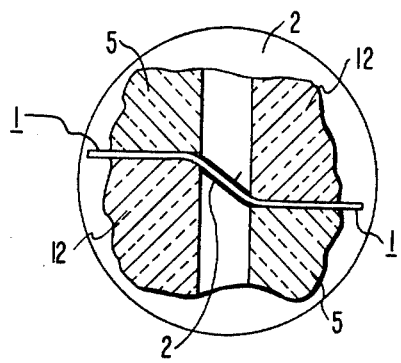
FIG. 6 is a magnified view of the signal-sample-extracting portion of the construction shown in FIG. 5.

It is proposed, in the bi-directional assembly configuration of FIGS. 4 and 6, that the radial displacement between the two light pipes might better be arrived at by ridgedly fixing one of the two light pipes and performing relative motion by movement of the other pipe. This might be performed by a fixture assembly such as shown in FIG. 5 wherein the left-hand light pipe 5 might be fixed within a central bore 13 in a rigid cylindrical member 14 and the adjacent light pipe arranged to be displaced sidewise, or radialwise, within the cavity 15 formed in member 14 by action of an adjustment screw 16 and a saddle member 17 against bias of a resilient back-up member 18. Member 18 acts to re-expand and return the right-hand light pipe 5 into alignment with the left-hand light pipe 5 upon unscrewing of the adjusting screw 16 until such right-hand light pipe 5 engages an extended portion 19 of the bore 13. By means of a stop nut assembly 20 affiliated with the adjusting screw 16, the extent of screwing out of such adjusting screw 16 and hence of sidewise displacement of the right-hand light pipe 5, and hence the extent of bending of the optical fiber 1 between the two light pipes, can be limited by engagement of the stop nut assembly 20 with the member 14. Optimum initial separation of the light pipe ends will be largely controlled by mechanical considerations, but close spacing is desirable to minimize optical leakage from the short fiber section between the ends. It is proposed that light pipes be formed from 0.1 inch diameter BK7 glass rod metalized on the exterior surface for total internal reflection at all angles of incidence. This diameter rod interfaces conveniently with PIN photodiode detectors having sensitive areas of comparable diameter. The slots through which the optical fiber 1 extends and in which the material 12 is disposed may be cut by means of a slow speed diamond saw to achieve a slot width in the range of 0.012 inches to 0.014 inches which is adequate to accommodate all available fibers (typical fiber diameter being 0.005 inches).

It also may be possible to fabricate a useful signal-extracting assembly using optical fibers having thin transparent buffer coatings that would obviate the need for stripping the buffer from the section of the optical fiber that extends through the light pipe. The above slot width could also accept these fibers, the advantage of their use being unbroken protection of the fiber surface throughout the entire length of the assembly.

Figure 7:
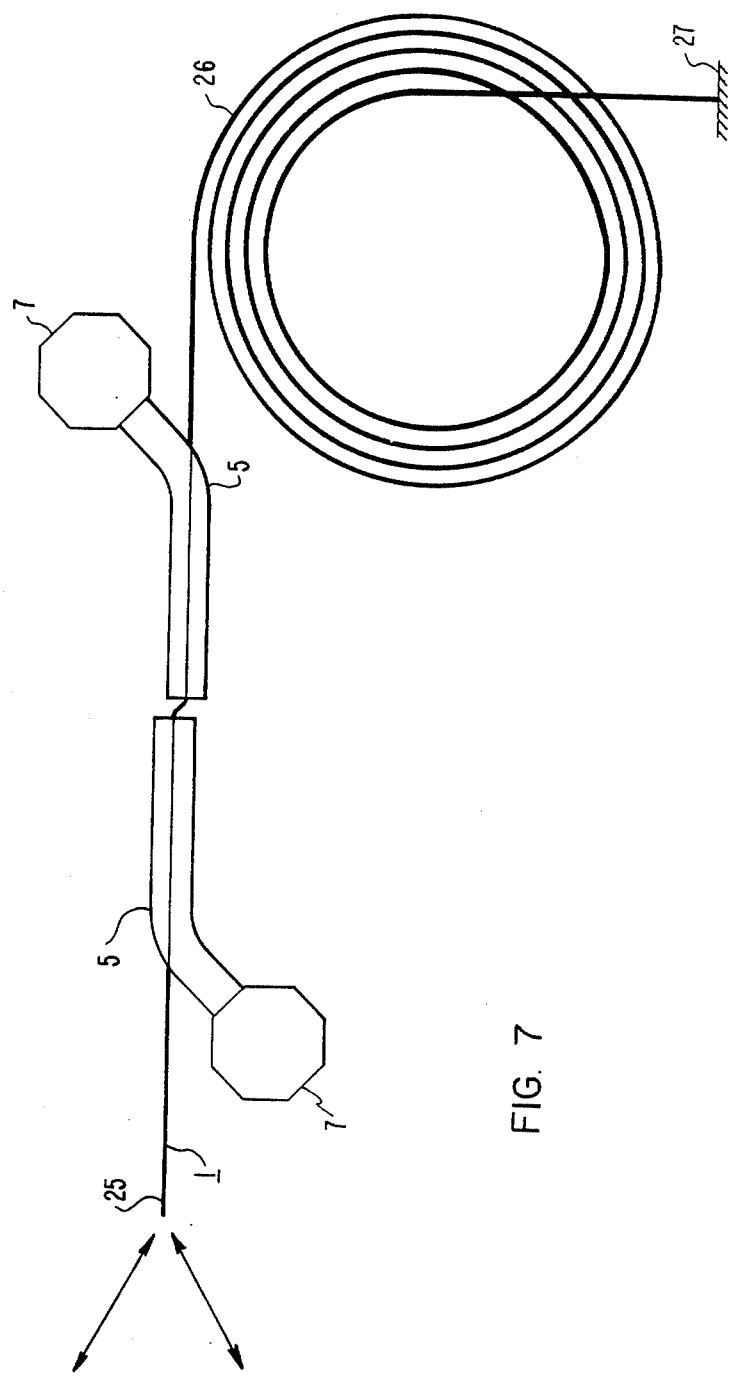
FIG. 7 is a schematic two-dimensional representation of a bi-directional optical fiber signal tapping assembly embodied in an optical fiber range simulator device.

FIG. 7 illustrates an application of the bi-directional signal tapping assembly of FIG. 4 in a fiber optic range simulator of a type in which an optical signal is introduced at an input end 25, travels through the fiber 1 including a coiled delay line portion 26 to a mirror 27 where such signal is reflected and returns back through such delay line portion 26 to the input portion 25 to provide optical echo return information for test of an optical range device (not shown). By use of a bi-directional optical fiber signal tapping assembly of the FIG. 4 type in affiliation within the optical fiber 1 between the input end portion 25 and coil 26 portion, introduction and return of the optical pulse introduced to such fiber can be sensed by the respective detector device 7; such information being used to calibrate the test device itself. The measured time interval between outputs of detectors 7 plus knowledge of the distance to the bend region between the light pipe ends, readily allows calibration of the delay line coil 26 of the optical fiber. The ability to sample the operating characteristics of the delay line coil portion 26 may also be put to diagnostic use and provide for evaluation of fiber characteristics, such as pulse dispersion. The same basic arrangement of the bi-directional signal sampling assembly might also be used to locate fiber optic transmission line faults by the pulse reflection method. In both delay line calibration and fault detection applications, the bi-directional signal sampling assembly would normally be located close to one end of the optical fiber where interrogatory pulses are strong. Undesired cladding modes of signal propagation may therefore exist and these should be removed by a suitable stripper (not shown).

I claim:
1. A directional optical fiber signal tapping assembly comprising:
(a) first and second light pipes each including a groove;

(b) an optical fiber positioned in the grooves in said light pipes;
(c) a support member having a first opening therein with said first light pipe being fixed rigidly in said opening, said support member also having a second opening therein with positioning means supporting said second light pipe in said second opening such that said light pipes can be selectively displaced from each other in a longitudinal direction thereby selectively bending said optical fiber thereby changing the amount of light which is coupled into said light pipes due to leakage from said optical fiber.

2. A directional optical fiber signal tapping assembly in accordance with claim 1 wherein said positioning means includes:
(a) a resilient member positioned between the edge of said second light pipe and the inner edge of said second opening;
(b) saddle means positioned to contact said second light pipe along an edge of said second light pipe; and
(c) screw means for applying pressure to said saddle means thereby causing said resilient means to deform to displace said first and second light pipes with respect to each other thereby causing said optical fiber to bend.

* * * * *